United States Patent
Ohr et al.

(10) Patent No.: US 7,634,627 B1
(45) Date of Patent: Dec. 15, 2009

(54) SYSTEM AND METHOD FOR PERFORMING EXTENT LEVEL BACKUPS THAT SUPPORT SINGLE FILE RESTORES

(75) Inventors: James P. Ohr, St. Paul, MN (US); David L. Teater, Minneapolis, MN (US)

(73) Assignee: Symantec Operating Corporation, Cupertino, CA (US)

( * ) Notice: Subject to any disclaimer, the term of this patent is extended or adjusted under 35 U.S.C. 154(b) by 238 days.

(21) Appl. No.: 11/208,371

(22) Filed: Aug. 19, 2005

(51) Int. Cl.
*G06F 13/00* (2006.01)

(52) U.S. Cl. ............ 711/162; 707/203; 707/204; 714/6

(58) Field of Classification Search ........ 711/162; 707/203, 204; 714/6
See application file for complete search history.

(56) References Cited

U.S. PATENT DOCUMENTS

| | | | |
|---|---|---|---|
| 5,129,088 A * | 7/1992 | Auslander et al. | 711/1 |
| 5,926,836 A | 7/1999 | Blumenau | 711/162 |
| 6,415,300 B1 | 7/2002 | Liu | 707/204 |
| 6,505,216 B1 | 1/2003 | Schutzman et al. | 707/204 |
| 7,024,527 B1 * | 4/2006 | Ohr | 711/161 |
| 7,047,378 B2 * | 5/2006 | Factor et al. | 711/162 |
| 7,120,654 B2 * | 10/2006 | Bromley | 707/204 |
| 7,159,087 B2 * | 1/2007 | Shinozaki et al. | 711/162 |
| 7,162,598 B2 * | 1/2007 | Watanabe et al. | 711/162 |
| 7,165,059 B1 * | 1/2007 | Shah et al. | 707/1 |
| 7,266,574 B1 * | 9/2007 | Boudrie et al. | 707/204 |
| 2003/0130986 A1 * | 7/2003 | Tamer et al. | 707/1 |
| 2003/0236956 A1 * | 12/2003 | Grubbs et al. | 711/162 |
| 2004/0199744 A1 * | 10/2004 | Bolik et al. | 711/220 |
| 2004/0250033 A1 | 12/2004 | Prahlad et al. | 711/162 |
| 2005/0246510 A1 * | 11/2005 | Retnamma et al. | 711/162 |
| 2005/0257062 A1 * | 11/2005 | Ignatius et al. | 713/176 |

OTHER PUBLICATIONS

"Inode" Jun. 9, 2004. retrieved from http://en.wikipedia.org/wiki/Inode as archived by www.archive.org on Jul. 11, 2004.*
*VERITAS NetBackup FlashBackup™ 4.5*, System Administrator's Guide for Unix, VERITAS Software Corporation, Mar. 2002, pp. 1-44.

* cited by examiner

*Primary Examiner*—Hong Kim
(74) *Attorney, Agent, or Firm*—Campbell Stephenson LLP

(57) ABSTRACT

Various methods and systems for performing extent-level backups that support single file restores are disclosed. For example, one a method involves accessing a list, which identifies several extents of a first storage device in a non-contiguous order. The non-contiguous order is non-contiguous with respect to an order in which the extents are arranged on the first storage device. The method then involves reading information from the extents of the first storage device, in the non-contiguous order identified by the list, and the writing the information to backup media. The information is written to the backup media in the non-contiguous order identified by the list. As a result, a first portion of the information, which is included in a first data object, may be less fragmented on the backup media than on the first storage device.

21 Claims, 6 Drawing Sheets

|    |    |    |    |    |
|----|----|----|----|----|
| A1 | A2 | D1 | C1 | B1 |
|    | B2 | B3 | D2 | E1 |
| F1 | A3 | D3 | D4 | C2 |
| F2 |    | E2 | A4 |    |

Extents on Storage Device

FIG. 2A

Map

| 1 | 1 | 0 | 0 | 1 |
|---|---|---|---|---|
| 0 | 1 | 1 | 0 | 0 |
| 0 | 1 | 0 | 0 | 0 |
| 0 | 0 | 0 | 1 | 0 |

Ordered List of Extents

| File A - Extent 1 |
|---|
| File A - Extent 2 |
| File A - Extent 12 |
| File A - Extent 19 |
| File B - Extent 5 |
| File B - Extent 7 |
| File B - Extent 8 |

FIG. 2B

| A1 | A2 | A3 | A4 | B1 |
|----|----|----|----|----|
| B2 | B3 | C1 | C2 | D1 |
| D2 | D3 | D4 | E1 | E2 |
| F1 | F2 |    |    |    |

Ordered Information on Backup Storage Device

FIG. 2C

SYSTEM AND METHOD FOR PERFORMING EXTENT LEVEL BACKUPS THAT SUPPORT SINGLE FILE RESTORES

FIELD OF THE INVENTION

This invention relates to data storage systems and, more particularly, to backing up information stored by a data storage system.

DESCRIPTION OF THE RELATED ART

Various information protection techniques are used to improve the availability of information. For example, backup techniques are used to provide redundant copies of information. If the original copy of the information is lost, due to equipment failure or human error, the information can be restored from a backup copy made at an earlier point in time. Backup techniques include full backups, which create a point-in-time image of all of the information within a particular set of information, and incremental backups, which copy only those portions of the set of information that are modified during a particular time period.

When a backup is performed, information is copied to a backup storage media. Often, a sequential media such as magnetic tape is used as the backup storage media. Sequential media are accessed sequentially, such that in order to read a particular block of data, all intervening media is passed under the read head, until the read head reaches the location of the desired block of data.

Sequential media are well suited to full backups and restores, which involve writing large amounts of data sequentially to the backup media and reading large amounts of data sequentially from the backup media. However, sequential media do not perform well when disparate portions of the backed up information are accessed, as is necessary when restoring individual files from a backup.

The problems associated with restoring individual files from backup are exacerbated when backups are performed at the extent level (as opposed to backups that are performed at the file level). For example, different portions of a file can be stored at disparate locations on a storage device that permits random access (e.g., such as a hard disk). The file system keeps track of where each portion of the file is located, and user accesses to the different portions of the file are directed to the appropriate locations on the storage device. Since the storage device supports random access, it does not take a significant amount of time to retrieve the portions of the file from the disparate locations.

If the information stored on this random access storage device is backed up at the extent level, the individual pieces of the file, which are fragmented on the storage device, will also be fragmented on the sequential backup media. If a user wants to retrieve the full file from the backup, the user will need to seek through the sequential media until each individual piece of the file has been retrieved. If the backup media stores a large amount of data, and if the pieces of the file are located at a significant distance from each other on the backup media, retrieving all of the pieces of the file can take an undesirably long time. For example, if the backup media stores several gigabytes of information, and if a file, which is several megabytes in size, is fragmented across the backup media, it may be necessary to seek past several gigabytes of information in order to retrieve the file. This can dramatically affect the amount of time needed to restore the file. For example, due to the need to seek past large amounts of information, the time needed to restore a few individual files may not be significantly less than the time needed to restore all of the backed up files. Accordingly, improved techniques for performing extent level backups are desired.

SUMMARY

Various embodiments of methods and systems for performing extent-level backups that support single file restores are disclosed. In one embodiment, a method involves accessing a list, which identifies several extents of a first storage device in a non-contiguous order. The non-contiguous order is non-contiguous with respect to an order in which the extents are arranged on the first storage device. The method then involves reading information from the extents of the first storage device, in the non-contiguous order identified by the list, and then writing the information to backup media. The information is written to the backup media in the non-contiguous order identified by the list. As a result, a first portion of the information, which is included in a first data object, may be less fragmented on the backup media than on the first storage device.

Such a method can also involve generating the list. For example, in one embodiment, generating the list involves accessing a file system, which maps a file to non-contiguous extents of the first storage device, and writing, to the list, information identifying each of those extents. Those first extents are written to the list in an order identified by the file system. Accessing the file system can involve traversing at least one of: a directory tree, an inode table, and a master file table.

In some embodiments, the method can also involve restoring a data object by reading information included in the data object from the backup media and writing the information included in the data object to a target storage device. The information included in the data object is read from contiguous blocks of the backup media. The information included in the data object is then written to non-contiguous extents of the target storage device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 2A illustrates a series of extents of a storage device, according to one embodiment of the present invention.

FIG. 2B shows a bitmap and an ordered list of extents that are generated while performing an extent level backup, according to one embodiment of the present invention.

FIG. 2C shows a series of extents of a backup storage device, according to one embodiment of the present invention.

Figure 1:
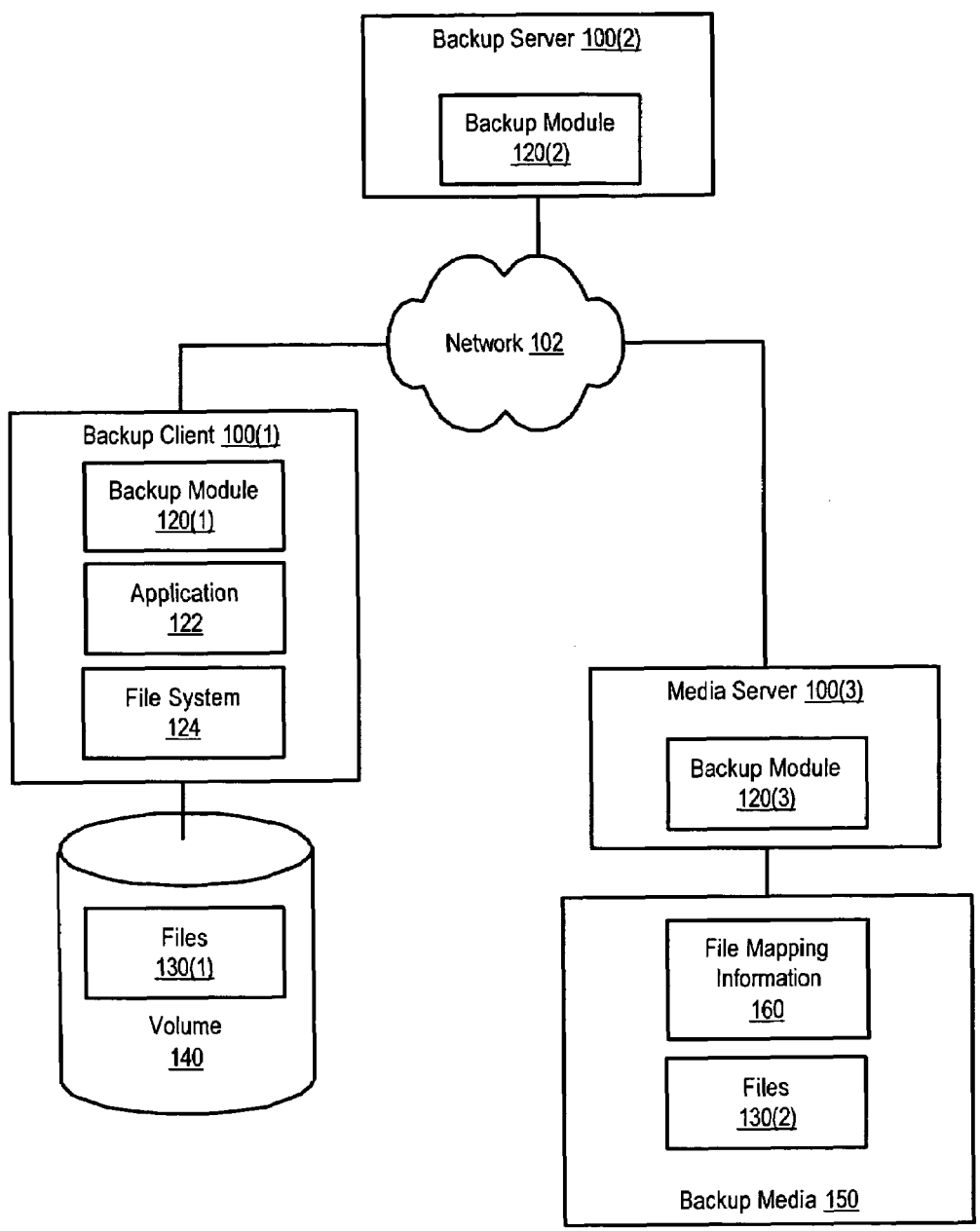
FIG. 1 is a block diagram of a data storage system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data storage system, according to one embodiment of the present invention. The components in FIG. 1 can perform backups, full restores from backups, and selective restores of individual files from backups. FIG. 1 includes a backup client 100(1), a backup server 100(2), and a media server 100(3). Backup client 100(1), backup server 100(2), and media server 100(3) respectively include backup modules 120(1), 120(2), and 120(3). In one embodiment, backup modules 120(1)-120(3) are implemented using VERITAS NetBackup™ software.

Backup client 100(1), backup server 100(2), and media server 100(3) are coupled by a network 102. Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links.

Backup client 100(1) is a computing device that is coupled to a storage device, volume 140. Volume 140 is a physical or logical storage device that stores file data 130(1). Volume 140 can include one or more physical storage devices (e.g., in one embodiment, volume 140 is implemented on a storage array that includes several independent hard drives). An application 122 executing on backup client 100(1) can access (e.g., read and write) file data 130(1) stored on volume 140.

Files 130(1) include information that is organized into files by file system 124. File system 124 provides the interface via which users, such as application 122, access information stored on volume 140. It is noted that backup client 100(1) could implement other mechanisms (e.g., databases, object-based storage, or the like) for abstracting data objects on volume 140 instead of and/or in addition to a file system, and thus that the information stored on volume 140 could be organized using data objects other than files. In general, backup client 100(1) includes functionality that provides an abstraction of data to user applications and that maps abstract data objects such as files to locations on a storage device.

The storage within volume 140 is subdivided into units, each of which can store information. Groups of one or more of these units of storage are referred to herein as extents. In some embodiments, extents are simply fixed-size groups of storage (e.g., each extent can include a constant number of bytes or blocks). In such embodiments, extents are identified using unique identifiers (e.g., logical block addresses, offsets, and the like) that identify the first unit of storage within the extent. In other embodiments, extents are variably-sized groups of storage that are specified using an offset (which indicates the location of the first unit of storage included in the extent) and a length (which indicates the number of units of storage within the extent). File system 124 maps a given file to the extent(s) that store the file.

As shown, backup client 100(1), backup server 100(2), and media server 100(3) each include backup and restore client software or agents implemented by backup modules 120(1)-120(3). Such agents typically receive instructions from backup server 100(2) and handle the extraction and placement of data for the backup client 100(1). Together, the backup and restore agents can backup and restore information stored on the client system.

Backup server 100(2) includes backup module 120(2), which initiates backups of client data. For example, backup module 120(2) can include a user interface that allows an administrator to specify when client data (such as file data 130(1), which is maintained by backup client 100(1)) should be backed up. Backup module 120(2) can also operate to control media server 100(3) and to interact with backup client 100(1).

Media server 100(3) implements backup module 120(3), which performs backup operations under direction from backup server 120(2). In this example, backup module 120(3) creates a backup by copying the information stored on volume 140 to backup media 150. In particular, backup module 120(3) can create a point-in-time copy 130(2) of the files stored on volume 140. Backup media 150 can include sequential storage media such as magnetic tape as well as random access media such as hard disk drives, optical disks (e.g., CDs (Compact Discs) and DVDs (Digital Versatile Discs), and the like.

In one embodiment, modifications to files 130(1) are prevented while a backup is being created. In such an embodiment, a backup is performed by copying information directly from volume 140 to backup media 150. In other embodiments, a point-in-time copy (e.g., a copy-on-write snapshot, a mirror-breakoff snapshot, or the like) of the information stored on volume 140 is first created, and the backup is performed by copying the information in the point-in-time copy to backup media 150. Each backup can be a full backup (e.g., a complete copy of all files and other information stored on volume 140) or an incremental backup (e.g., a partial copy, which includes only the files and other information that have been modified since the last backup was created).

Backup module 120(3) performs an extent level backup. In other words, instead of backing up logical data objects (e.g., by reading a file via the file system 124, and then writing that file to backup media 150), backup module 120(3) copies the information stored on volume 140 at the extent (e.g., an extent can be a block or a constant or variable sized group of blocks) level. However, instead of simply copying information from volume 140 in block order, backup module 120(3) accesses file system 124 (or some other application, such as a volume manager, that maps data objects to extents of an underlying storage device) and generates an ordered list of the extents of volume 140 that store valid file information (alternatively, this ordered list can be generated by backup module 120(1) and provided to backup module 120(3) via network 102). Backup module 120(3) then copies the extents, without going through the file system (or the other application, if the other application provided the mapping information), from volume 140 to backup media 150 in the order indicated by the list of extents. Thus, the file information stored in the extents is backed up at the extent level (i.e., the backup is a "raw" partition backup). It is noted that the underlying storage device from which the extent level backup is performed can itself be a logical storage device (e.g., a logical volume).

The list of extents can be stored as part of file mapping information 160. The list of extents can be used to restore the copied information from the backup media, during an extent level restore of the complete volume. In general, file mapping information 160 maps information stored on backup media 150 to one or more files and/or to one or more locations of volume 140.

It is noted that, while the functionality of backup modules 120(1)-120(3) has been divided into client, server, and media server functionality in the embodiment of FIG. 1, this functionality can be combined and/or rearranged in other embodiments. For example, in an alternative embodiment, backup module 120(2) can include media server functionality (provided by backup module 120(3) in FIG. 1), eliminating the need for a separate media server. Similarly, the functionality provided by backup modules 120(1), 12(2), and/or 120(3) can be combined and implemented on backup client 100(1), eliminating the need for separate backup and media servers 100(2) and 100(3).

Backup client 100(1), backup server 100(2), and media server 100(3) can each include one or more computing devices configured to execute software implementing various applications (e.g., application 122, backup modules 120(1)-120(3), file system 124, and the like). In such embodiments, each computing device can include a workstation, personal computer, server, Personal Digital Assistant (PDA), cell phone, storage network switch, storage device, storage array controller, or any other device configured to execute software implementing such applications. Alternatively, each computing device can be implemented from hardware (e.g., logic devices such as programmable logic devices (PLDs), field programmable gate arrays (FPGAs), and the like) configured to perform the functions of such applications, or from a combination of hardware and software implementing the functionality of the applications.

FIG. 2A illustrates a series of extents of a storage device. This storage device is represented by a grid, and each square within the grid represents an extent. The first extent stores information A1, the second extent stores information A2, the third extent stores information D1, and so on (continuing from the upper left corner of the grid to the lower right corner). The information is organized into files A-F, and each file includes one or more parts. The parts are identified by a letter representing a file and a number. Thus, File A includes four parts: A1, A2, A3, and A4. Similarly, File B includes parts B1, B2, and B3; File C includes parts C1 and C2; File D includes parts D1, D2, D2, and D4; File E includes parts E1 and E2; and File F includes parts F1 and F2. The blank squares represent extents that either store non-file data (e.g., these extents can store metadata) or store invalid information. The arrangement of information shown in FIG. 2A illustrates how files can be fragmented (i.e., different parts of a file can be stored in non-contiguous extents) within a storage device such as volume 140 of FIG. 1.

FIG. 2B shows a map and an ordered list of extents that can be generated while performing an extent level backup. The map and ordered list of extents can be generated by backup module 120(3) of FIG. 1, by accessing file mapping information provided by file system 124 of FIG. 1. The map and ordered list of extents can alternatively be generated by backup client 120(1) and transferred to backup module 120 (3) via a network.

The map is represented by a grid, shown in the left portion of FIG. 2B. Each extent shown in FIG. 2A is represented by a square within the grid of FIG. 2B. The value of each square indicates whether a corresponding extent has been processed by the backup module. The map can be implemented as a bitmap or other data structure. For example, if extents have constant size, the map can be implemented as a bitmap that includes one bit for each extent of the storage device to be backed up. While the same granularity (each square corresponds to one extent) is used in the map and ordered list of extents in the example of FIG. 2B, it is noted that other embodiments can be implemented so that the map and ordered list of extents each have a different granularity. For example, if extents can vary in size, a bitmap can also be used; in such an embodiment, a given extent may be represented by more than one bit (e.g., if each bit represents a block of data, four bits can be used to represent an extent that is four blocks in size). Alternative representations (which may not be implemented using bitmaps) can also be used to track which extents of the storage device have been processed by the backup module.

A backup module generates the map and ordered list of extents by accessing information that maps data objects (e.g., files) to extents of the storage device. For example, a backup module can navigate a directory tree structure to identify each file within a file system. Alternatively, the backup module can access files by traversing an inode table or master file table (unlike the directory tree structure, inode and master file tables are likely to identify files in order of creation time). For each identified file, the backup module can then access file system information that maps that file to one or more extents of the storage device. In this manner, each file can be mapped to one or more extents. For example, assuming that the extents of FIG. 2A are numbered consecutively, first from left to right, beginning with Extent 1 in the upper left corner and ending with Extent 20 in the bottom right corner of FIG. 2A, File A maps to Extents 1, 2, 12, and 19.

As files are mapped to one or more extents of a storage device, the backup module adds the extents within that file to the ordered list of extents. Thus, the extents that store parts of File A have been added to the ordered list of extents in FIG. 2B. After the extents that store parts of File A, the extents (Extents 5, 7, and 8) that store parts of File B are listed. While not shown in FIG. 2B, the extents that store parts of Files C-F can be added to the ordered list by the backup module in a similar manner.

The extents can be added to the ordered list in file order, as shown in FIG. 2B (e.g., Extent 1 stores part 1 of File A, Extent 2 stores Part 2 of File A, and so on). However, in alternative embodiments, the extents storing a given file may not be identified in file order. For example, extents 1, 2, 12, and 19 can be listed in a different order within the ordered list, while still being grouped together within the list.

In some embodiments, the ordered list of extents is generated so that the extents that store a given file are grouped together within the list, as shown in FIG. 2B. In other embodiments, some commingling of files is allowed. For example, in such an embodiment, files within the same directory (which is itself a special type of file) can be commingled, but files that are in different directories are not commingled. Thus, in an embodiment that allows commingling, if Files A and B are in the same directory, the ordered list of extents could identify the extents in the following order: 1, 2, 5, 7, 8, 12, and 19. Thus, the extents that store information in the same directory can be grouped together within the list. In general, the ordered list of extents is generated so that extents that store parts of the same file or group of files will be grouped more closely together, while extents that store parts of different files or different groups of files will be grouped less closely together.

Additionally, as extents are added to the ordered list of extents, the map is updated to indicate that these extents have been processed by the backup module. Thus, the portions of the map (squares 1, 2, 5, 7, 8, 12, and 19) that correspond to the extents listed in the ordered list have been set to a value (a logical 1 in this example) that indicates that those extents have been processed. After all of the files have been processed, the map will identify which extents store files and which extents store non-file data and/or invalid data.

FIG. 2C shows information stored on a backup storage device (e.g., such as backup media 150 of FIG. 1), when a backup is performed using the map and ordered list of extents shown in FIG. 2B. As noted above, a backup module first generates an ordered list of extents and then copies the information from those extents, in the order indicated by the list, to the backup media. Thus, the backup module has copied the information stored in the extents of FIG. 2A to the backup storage device in the order indicated by the ordered list.

The backup module copies this information by accessing the storage device at the extent level, not by accessing logical objects (e.g., via a file system or other application that maps logical objects to units or extents of an underlying storage device). This can lead to better performance (e.g., in terms of less time required to perform the backup and/or fewer processing resources needed to perform the backup), relative to backups that are performed by accessing logical objects.

By using the ordered list, the information that makes up File A is now stored contiguously on the backup media. Similarly, the information that makes up each of Files B-F has been stored contiguously on the backup media.

If the backup storage device is a sequential storage device such as a magnetic tape drive, storing information that makes up the same file contiguously on the backup media can increase the performance of single file restores (relative to the performance of extent level backups that are created by simply copying information from the storage device in the order that the information is stored on the storage device). In particular, parts of the file will not need to be fetched from disparate areas of the sequential storage media, which can reduce the time required to read the file. Similarly, if the information that stores files within the same directory is stored contiguously on the backup media (e.g., if the ordered list is created by accessing a directory tree structure), single directories can be restored more efficiently than if the information had simply been copied in the same order that the information was stored on the storage device. While these benefits occur primarily in embodiments that use sequential backup media, some benefits can also be derived in embodiments in which the backup media is a random access device.

While the information stored on backup media is illustrated as being stored in extents having the same granularity as the primary storage device in FIGS. 2A and 2C, it is noted that other embodiments can be implemented differently. For example, in one embodiment, information that is stored in multiple discontiguous extents on the primary storage device can be stored in fewer extents (or even a single extent) on the backup storage device. Accordingly, while the information that makes up file A is stored in four extents on the primary storage device, this information can be aggregated into three or less extents on the backup storage device.

Figure 3:
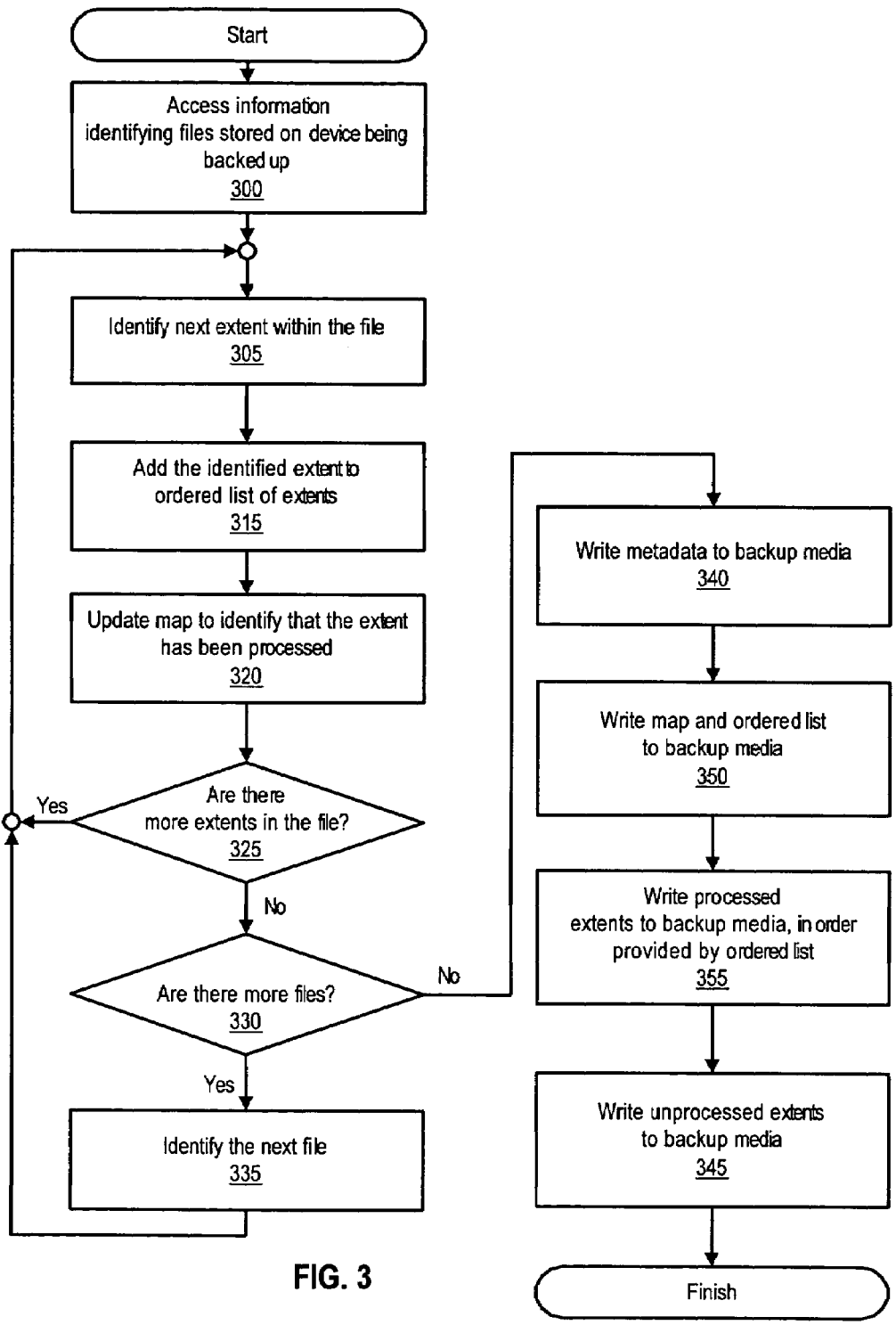
FIG. 3 is a flowchart of a method of performing an extent level backup, according to one embodiment of the present invention.

FIG. 3 is a flowchart of a method of performing an extent level backup. This method can be performed by a backup module such as backup module 120(3) of FIG. 1. It could also be performed by a client backup module such as backup module 120(1), instead of and/or in addition to backup module 120(3).

At 300, the backup module accesses information identifying the files stored on the storage device being backed up. For example, the backup module can access a structure maintained by a file system, such as an inode table, master file table, a directory tree, or the like, in order to identify each file that is stored on the storage device.

The type of structure accessed at 300 will affect the order in which the extents storing particular files are added to the ordered list. For example, if the backup module traverses a directory tree in order to identify each file, then files will be processed in directory order. This in turn causes extents in the same directory to be grouped together in the ordered list. If instead an inode table or master file table is used, extents that store files that are created at approximately the same time will be grouped together in the ordered list.

For each file identified in the structure accessed at 300, the backup module adds the extents in that file to an ordered list, as shown by operations 305-325. At 305, the backup module identifies the next extent within a file. For example, if a new file has been identified, the backup module can perform function 305 by identifying the first extent within that file. Extents within a file can be identified by accessing a file system (e.g., by accessing an inode or other metadata that maps files to extents of an underlying storage device). The extents within a given file can be identified either in file order or in an order (e.g., logical block address order) that relates to the order of information stored on the storage device.

After the next extent has been identified at 305, that extent is added to a list of ordered extents, as shown at 315. The extent can be added by appending a new entry to a list of ordered extents. The entry can include information identifying the extent (e.g., an offset and, if variable-sized extents are supported, a length) as well as information identifying the file and/or the part of the file stored by that extent.

A map (e.g., a bitmap or other structure) is then updated to indicate that the extent has been processed, as shown at 320. The map includes an entry (e.g., a bit) corresponding to each extent of the storage device being backed up. The entry corresponding to the extent added to the ordered list at 315 is updated (e.g., from logical 0 to logical 1), such that the value of the entry identifies that corresponding extent has been processed. The map indicates the locations of extents within the storage device (e.g., if extents are fixed size, each entry in the map can correspond to a particular extent, and the map entries can be ordered in a manner that corresponds to the locations of the extents represented by the map entries).

If there are additional extents in the file, as determined at 325, operations 305, 315, and 320 are repeated for the next extent in the file. This process continues until all of the extents within the file have been processed. Similarly, if there are additional files to process, as determined at 330, the next file to process is identified at 335 and operations 305, 315, 320, and 325 are repeated for each extent in that file.

After all of the extents that store files and/or parts of files have been processed, metadata can be written to the backup media, as indicated at 340. This metadata can include information that identifies file names and permissions, as well as information that can be used to locate files and other metadata (such as non-file data, the ordered list, and the map) on the backup media. Thus, the metadata identifies where other types of data (e.g., the map, the ordered list, the non-file data, and the file data) are stored on the backup media. The metadata is used when performing individual file restores from the backup (e.g., to locate the ordered list on the backup media, which is in turn used to locate the individual file on the backup media).

At 350, the map and the ordered list are written to the backup media. Then, the extents that were processed (by operations 305, 315, and 320) are written to the backup media, in the order that those extents are identified within the ordered list of extents, as shown at 355.

At 345, the unprocessed extents (as identified by the map) are copied to the backup media. These extents store non-file data. In some embodiments, these extents are copied to the backup media in the order that the extents are identified in the map.

It is noted that the backup media to which the metadata, map, ordered list, non-file data, and files are being written may include several storage devices (e.g., several magnetic tapes). In such situations, different types of information can be written to different backup devices (e.g., the metadata, map, ordered list, and non-file data can be written to one tape, while the files are written to another tape).

In some embodiments, the backup media is magnetic tape. In such embodiments, when extents that store portions of the same file are being copied, the write head can be maintained at the last write position (i.e., no inter-block gap is written to the magnetic tape) between writes. Accordingly, all of the information in a given file can be written to a single block of the tape. After all extents that store parts of that file have been copied, an inter-block gap can be written to tape. Then, the extent(s) that store the next file can be copied.

It is noted that, while the description of FIG. 3 is specific to files, similar techniques can be used to perform an extent level backup of other data objects. Furthermore, it is noted that the backup can be performed from a point-in-time copy of the storage device being backed up (as opposed to being performed directly from that storage device). Additionally, similar techniques can be used to perform an incremental backup (e.g., only modified files can be mapped to extents). Furthermore, the operations shown in FIG. 3 can be combined and/or reordered in some embodiments (e.g., functions 340, 345, 350, and 355 can be performed in different orders). Additionally, other operations can be included instead of and/or in addition to those operations shown in FIG. 3.

Figure 4:
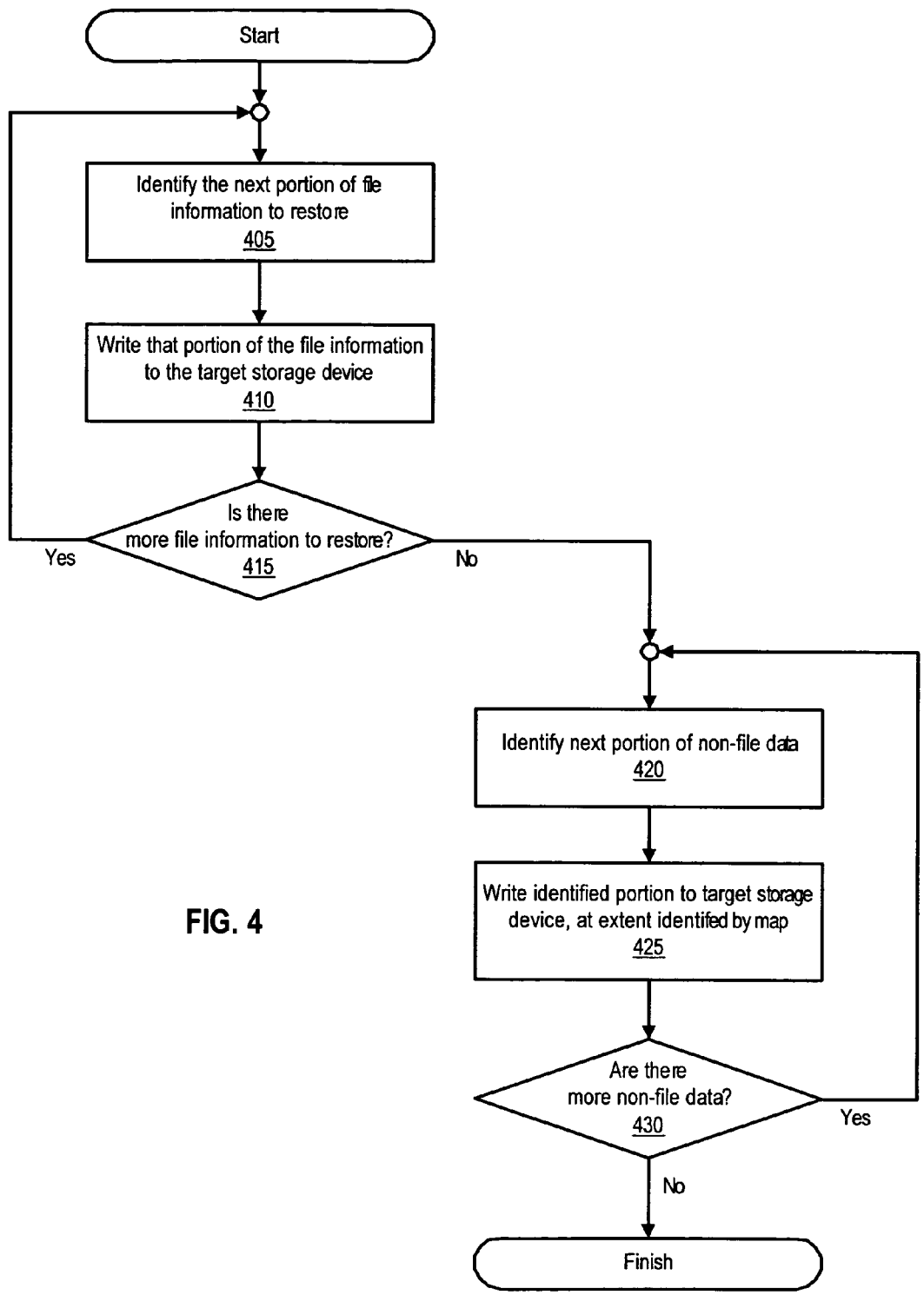
FIG. 4 is a flowchart of a method of performing a full restore from an extent level backup, according to one embodiment of the present invention.

FIG. 4 is a flowchart of a method of performing a full restore from an extent level backup such as the one created in FIG. 3. The method of FIG. 4 can be performed by a backup module (e.g., backup module 120(3) of FIG. 1). This method can be performed without differentiating among information that makes up different files, and without having to go through the file system.

The method begins by restoring the file data from the backup media to the target storage device. In one embodiment, the files are restored by identifying the starting location of the file data on the backup media (this location can be identified by the metadata), and then using the ordered list to copy the file information from the backup media to the appropriate extents of the target storage device. Thus, the ordered list and map can be read from the backup media (in order to locate the appropriate file data) prior to beginning to restore the files from the backup media.

As shown at 405, the next portion of file information to restore is identified (e.g., by accessing the ordered list and/or the metadata). That portion of file information is then copied to the target storage device as shown at 410. In one embodiment, these portions of the file information are copied to the extents of the target storage device identified by the ordered list. For example, if the ordered list indicates that portion 1 is located at Extent 20, that portion of file information can be copied from the backup media to Extent 20 of the target storage device. As this shows, file data can be read sequentially (or from contiguous locations) of the backup media and then written to disparate locations on the target storage device. Operations 405 and 410 can be repeated for each portion of the file information stored on the backup media, as determined at 415. It is noted that operations 405 and 410 can be performed without accessing a file system.

Once the file data has been restored, the non-file data stored on the backup media are restored. This can be done by first reading the map and the metadata from the backup device. The metadata can be used to identify the location at which the backup device stores non-file data (e.g., by accessing the metadata described above). The map can then be used to write each unit of non-file data to the appropriate location of the target storage device. At 420, the backup module identifies the next portion of non-file data to restore (the "next" portion is the first portion of non-file data stored on the backup media, when the method begins).

Identifying the next portion can involve identifying both the location of the next portion of non-file data on the backup media and identifying the appropriate location of the target storage device to which that portion of non-file data should be copied. For example, the metadata can identify the offset, on the backup media, at which all non-file information is stored. The map can then be used to identify the location of a particular portion of the non-file information within the set of non-file information. The map can also identify the location on the target storage device to which that portion of the non-file data should be copied. At 425, the identified portion of non-file data is copied from the backup media to the target storage device. In particular, the portion of the non-file data is copied to the extent of the target storage device that is identified by the map. It is noted that, as used herein, "non-file" data is any valid data that is not recognized as a file by the file system that is used to perform the mapping. Thus, non-file data can include metadata used by the file system as well as data that is recognized as a file by a different file system. Operations 420 and 425 are repeated until all file data has been restored to the target storage device, as determined at 430.

While the embodiment of FIG. 4 has illustrated a particular set of operations that can be performed, it is noted that other operations can be included instead of and/or in addition to those shown in FIG. 4. Additionally, the operations shown in FIG. 4 can be performed in a different order than illustrated. For example, in an alternative embodiment, the non-file data can be restored prior to restoration of the file data.

Figure 5:
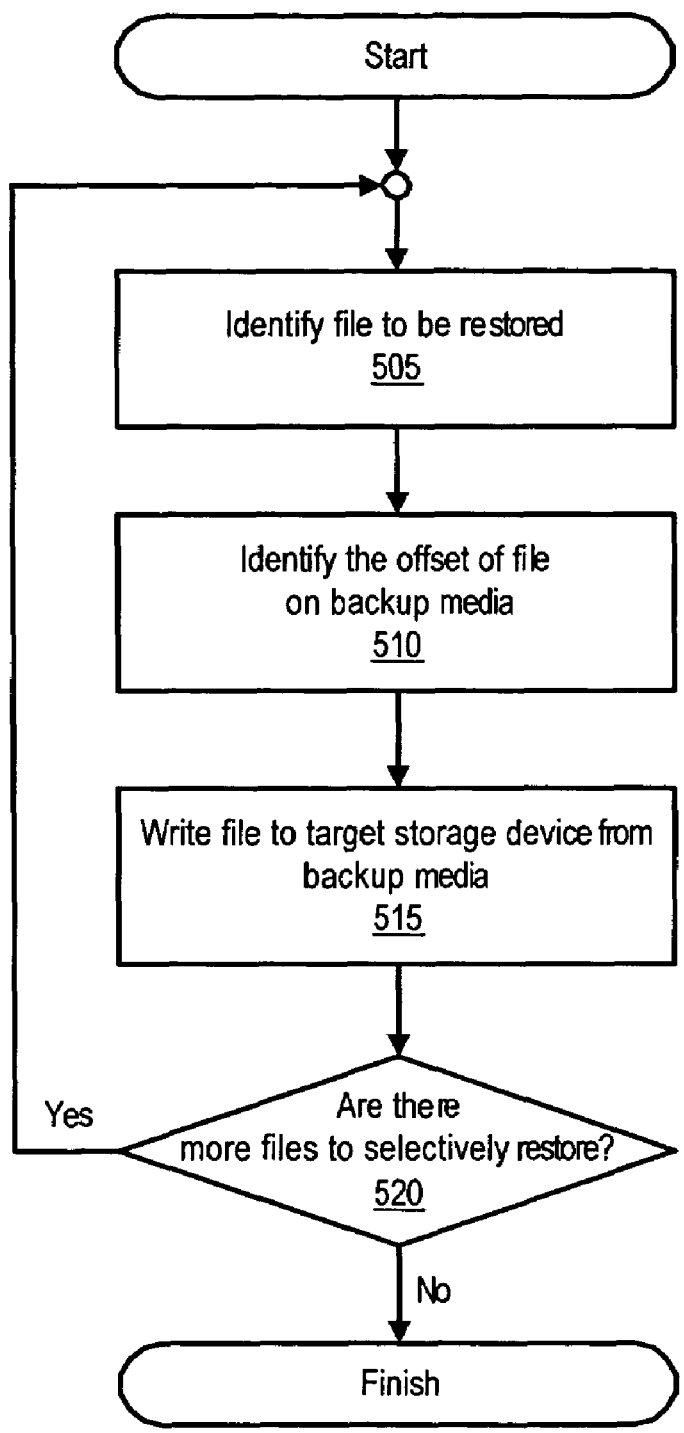
FIG. 5 is a flowchart of a method of selectively restoring individual files from an extent level backup, according to one embodiment of the present invention.

FIG. 5 is a flowchart of a method of selectively restoring individual files from an extent level backup. This method can be performed by a backup module (e.g., backup module 120 (3) of FIG. 1), in response to receiving user input selecting one or more files to restore. This method can also be performed in response to receiving control signals, identifying file(s) to restore, from another backup module, if a distributed backup system is implemented.

The method begins at 505, when the file to be restored is identified (e.g., within the file metadata stored on the backup media). The backup module then identifies the location of the file on the backup media, as shown at 510. For example, metadata can identify the location of each portion of the file within the set of file data. The backup module can then seek to the location of the first portion of the file on the backup media.

At 515, the file is copied from the backup media to the target storage device. The file can be read sequentially from the backup media. The file can be restored to the extents of the target storage device identified in the ordered list of extents; however, the file can also be restored via the file system (i.e., instead of performing a extent level restore, a file level restore can be performed). If there are more files to selectively restore, as determined at 520, operations 505, 510, and 515 can be repeated for the next file.

It is noted that, while the description of FIGS. 3, 4, and 5 is specific to files, similar techniques can be used to perform extent level backups and restores of other data objects. Furthermore, it is noted that the backup of FIG. 3 can be performed from a point-in-time copy of the storage device being backed up (as opposed to being performed directly from that storage device). Additionally, similar techniques can be used to perform an incremental backup (e.g., only modified files can be mapped to extents). Furthermore, the operations shown in FIGS. 3, 4, and 5 can be combined and/or reordered in some embodiments (e.g., functions 340, 345, 350, and 355 can be performed in different orders). Additionally, other operations can be included instead of and/or in addition to those operations shown in FIGS. 3, 4, and 5.

Figure 6:
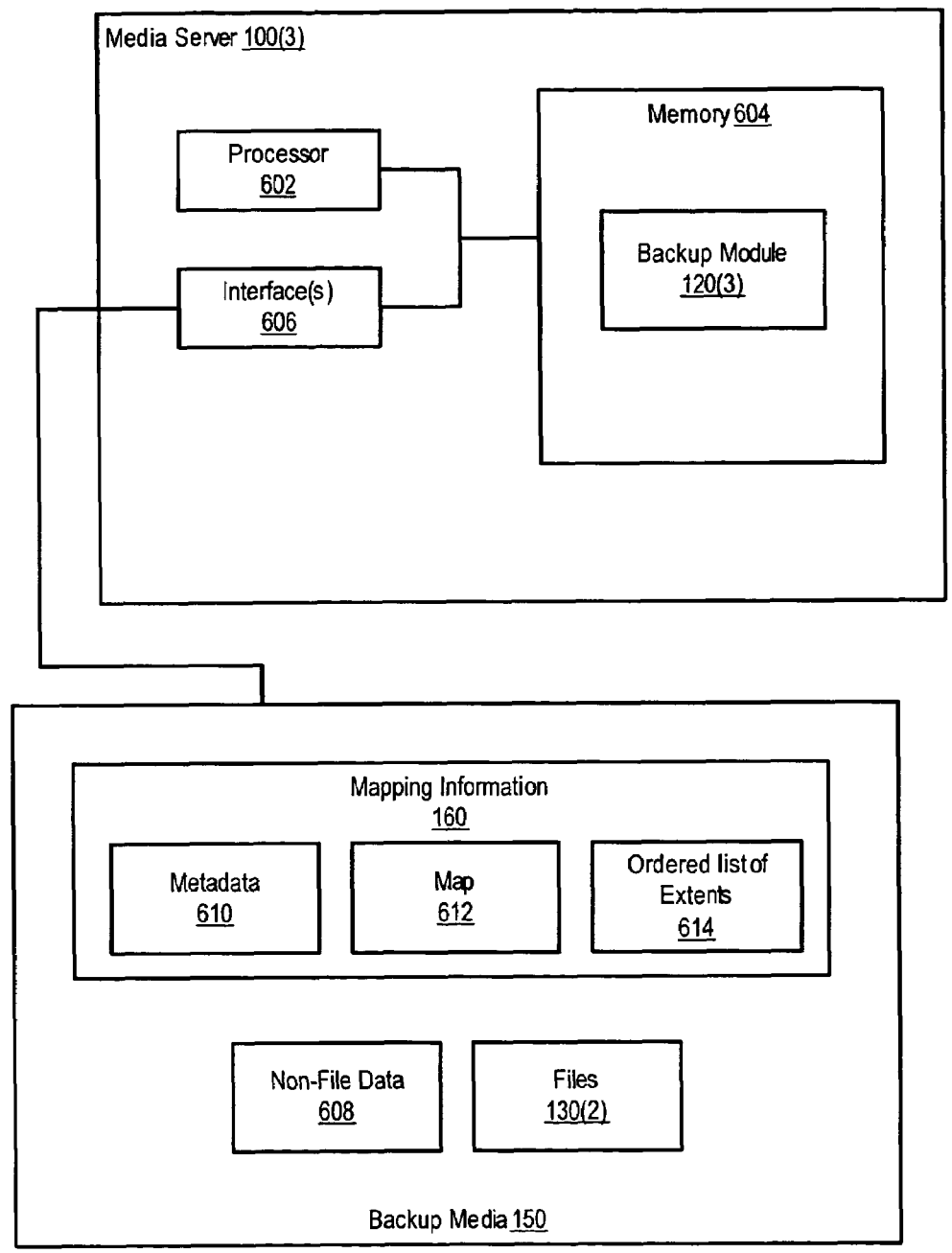
FIG. 6 is a block diagram of a system that performs backups and restores, according to one embodiment of the present invention.

FIG. 6 is a block diagram of a system that performs backups and restores. In particular, FIG. 6 is a block diagram of a computing device that implements media server 100(3) of FIG. 1. FIG. 6 illustrates how backup module 120(3) can be implemented in software. As illustrated, media server 100(3) includes one or more processors 602 (e.g., microprocessors, PLDs (Programmable Logic Devices), or ASICs (Application Specific Integrated Circuits)) configured to execute program instructions stored in memory 604. Memory 604 can include various types of RAM (Random Access Memory), ROM (Read Only Memory), Flash memory, MEMS (Micro Electro-Mechanical Systems) memory, and the like. Media server 100(3) also includes one or more interfaces 606. Processor 602, memory 604, and interface 606 are coupled to send and receive data and control signals by a bus or other interconnect.

Interface(s) 606 can include an interface to backup media 150, as shown in FIG. 9. Interface(s) 906 can also include an interface to a network (e.g., network 102 of FIG. 1) for use in backing up information from another site and/or for communicating with a backup server (e.g., if a distributed backup system, as shown in FIG. 1, is being implemented).

Backup media 150 stores mapping information 160, which can include metadata 610, a map 612 (e.g., used to identify which extents store non-file data), and an ordered list of extents 614. Backup media 150 can also store non-file data 608 and files 130(2). Backup media can include one or more storage devices, such as magnetic tapes, hard disk drives, optical storage devices, and the like.

The program instructions and data implementing backup module 120(3) can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order be executed by processor 602, the instructions and data implementing backup module 120(3) are loaded into memory 604 from the other computer readable medium. The instructions and/or data can also be transferred to media server 100(3) for storage in memory 604 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup module 120(3) are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
accessing a list, wherein
the list identifies a plurality of extents of a first storage device,
the list identifies the extents in a non-contiguous order, wherein
the non-contiguous order is non-contiguous with respect to an order in which the extents are arranged on the first storage device;
reading information from the extents of the first storage device, in the non-contiguous order identified by the list; and
writing the information to backup media, wherein
the information is written to the backup media in the non-contiguous order identified by the list.

2. The method of claim 1, wherein
a first portion of the information is included in a first data object, and
a version of the first data object stored on the backup media is less fragmented than a version of the first data object stored on the first storage device.

3. The method of claim 1, wherein the writing the information to the backup media comprises aggregating information distributed among several ones of the extents of the first storage device into an extent of the backup media.

4. The method of claim 1, further comprising:
generating the list, wherein the generating the list comprises:
accessing a file system, wherein
the file system maps a file to a plurality of first extents included in the plurality of extents of the first storage device,
the first extents are non-contiguous on the first storage device; and
writing to the list information identifying each of the first extents, wherein the first extents are identified within the list in an order identified by the file system.

5. The method of claim 4, wherein the accessing the file system comprises traversing at least one of: a directory tree, an inode table, and a master file table.

6. The method of claim 1, further comprising:
identifying a first file;
identifying which of the plurality of extents of the first storage device store information included in the first file;
writing to a list information identifying ones of the extents that store information included in the first file; and
updating a portion of a map corresponding to a first one of the identified ones of the plurality of extents, wherein
the portion of the map identifies that the first one of the identified ones of the plurality of extents has been processed, subsequent to being updated.

7. The method of claim 6, further comprising:
identifying non-processed ones of the plurality of extents of the first storage device in the map; and
writing information stored in the non-processed ones of the extents to the backup media in an order identified in the map.

8. The method of claim 1, further comprising:
restoring a data object, wherein the restoring the data object comprises:
reading information included in the data object from the backup media, wherein the information included in the data object is stored in contiguous blocks of the backup media; and writing the information included in the data object to a target storage device.

9. The method of claim 8, wherein
the information included in the data object is written to a plurality of non-contiguous extents of the target storage device, and
the list identifies the non-contiguous extents of the target storage device.

10. A method comprising:
receiving information indicating a selection of one of a plurality of data objects to restore;
accessing a list stored on a backup media in response to receiving the selection, wherein the list identifies a plurality of extents that each store at least a portion of the data object; and
writing the data object from the backup media to the extents, identified in the list, of a target storage device in response to receiving the selection, wherein
information in the data object is stored contiguously on the backup media, and
the extents of the target storage device are non-contiguous.

11. The method of claim 10, further comprising:
accessing a bitmap stored on a backup media, wherein
the bitmap identifies a plurality of extents that store non-data-object information, and
writing the non-data-object information from the backup media to the identified extents of the target storage device.

12. A system comprising:
a list of extents; and
a backup module coupled to access the list of extents, wherein
the list identifies a plurality of extents of a first storage device in a non-contiguous order,
the non-contiguous order is non-contiguous with respect to an order in which the extents are arranged on the first storage device,
the backup module is configured to read information from the extents of the first storage device, in the non-contiguous order identified by the list, and
the backup module is configured to write the information to backup media in the order that the information is read from the extents of the first storage device.

13. The system of claim 12, wherein
the backup module is configured to access a file system, wherein
the file system maps a file to a plurality of first extents included in the plurality of extents of the first storage device, and
the first extents are non-contiguous on the first storage device; and
the backup module is configured to write to the list information identifying each of the first extents, wherein
the first extents are identified within the list in an order identified by the file system.

14. The system of claim 12, wherein
the backup module is configured to restore a data object, wherein restoring the data object comprises:
reading information included in the data object from the backup media, wherein
the information included in the data object is stored in contiguous blocks of the backup media; and
writing the information included in the data object to a target storage device, wherein
the information included in the data object is written to a plurality of non-contiguous extents of the target storage device.

15. A computer readable medium comprising program instructions executable to:
access a list, wherein
the list identifies a plurality of extents of a first storage device,
the list identifies the extents in a non-contiguous order, wherein
the non-contiguous order is non-contiguous with respect to an order in which the extents are arranged on the first storage device;
read information from the extents of the first storage device, in the non-contiguous order identified by the list; and
write the information to backup media, wherein
the information is written to the backup media in the non-contiguous order identified by the list.

16. The computer readable medium of claim 15, wherein the program instructions are further executable to:
generate the list, wherein generating the list comprises:
accessing a file system, wherein
the file system maps a file to a plurality of first extents included in the plurality of extents of the first storage device,
the first extents are non-contiguous on the first storage device; and
writing to the list information identifying each of the first extents, wherein the first extents are identified within the list in an order identified by the file system.

17. The computer readable medium of claim 15, wherein the program instructions are further executable to:
restore a data object, wherein restoring the data object comprises:
receiving information indicating a selection of the data object, from among a plurality of data objects;
reading information included in the data object from the backup media in response to reading the selection, wherein
the information included in the data object is stored in contiguous blocks of the backup media; and
writing the information included in the data object to a target storage device in response to receiving the selection, wherein
the information included in the data object is written to a plurality of non-contiguous extents of the target storage device.

18. A system comprising:
means for accessing a list, wherein
the list identifies a plurality of extents of a first storage device,
the list identifies the extents in a non-contiguous order, wherein
the non-contiguous order is non-contiguous with respect to an order in which the extents are arranged on the first storage device;
means for reading information from the extents of the first storage device, in the non-contiguous order identified by the list; and
means for writing the information to backup media, wherein
the information is written to the backup media in the non-contiguous order identified by the list.

19. The system of claim 18, further comprising:
means for accessing a file system, wherein the file system maps a file to a plurality of first extents included in the plurality of extents of the first storage device, the first extents are non-contiguous on the first storage device; and means for writing to the list information identifying each of the first extents, wherein the first extents are identified within the list in an order identified by the file system.

20. A system comprising:

a processor; and a memory coupled to the processor, wherein the memory stores program instructions executable by the processor to:

access a list, wherein the list identifies a plurality of extents of a first storage device, the list identifies the extents in a non-contiguous order, wherein the non-contiguous order is non-contiguous with respect to an order in which the extents are arranged on the first storage device;

read information from the extents of the first storage device, in the non-contiguous order identified by the list; and write the information to backup media, wherein the information is written to the backup media in the non-contiguous order identified by the list.

21. The method of claim 1, wherein the list identifies the extents in a non-sequential order, wherein the non-sequential order is non-sequential with respect to a sequential order in which the extents are arranged on the first storage device.

\* \* \* \* \*